United States Patent
Williams et al.

(10) Patent No.: US 6,738,834 B1
(45) Date of Patent: May 18, 2004

(54) SYSTEM FOR RECONFIGURING A PERIPHERAL DEVICE USING CONFIGURATION RESIDING ON THE PERIPHERAL DEVICE BY ELECTRONICALLY SIMULATING A PHYSICAL DISCONNECTION AND RECONNECTION TO A HOST DEVICE

(75) Inventors: Timothy J. Williams, Bellevue, WA (US); Mark E. Hastings, Mukilteo, WA (US)

(73) Assignee: Cypress Microsystems, Bothell, WA (US)

(*) Notice: Subject to any disclaimer, the term of this patent is extended or adjusted under 35 U.S.C. 154(b) by 68 days.

(21) Appl. No.: 10/197,152

(22) Filed: Jul. 15, 2002

(51) Int. Cl.[7] .................. G06F 13/00; G06F 13/368; H04L 12/50; H02H 3/06
(52) U.S. Cl. ................... 710/8; 710/9; 710/10; 710/15; 710/18; 710/33; 710/72; 710/100; 713/1; 713/2; 713/100; 713/600; 714/43; 714/47
(58) Field of Search ................. 710/8, 9, 10, 15, 710/18, 33, 72, 100; 713/1, 2, 100, 600; 714/43, 47

(56) References Cited

U.S. PATENT DOCUMENTS

| 6,012,103 | A |   | 1/2000 | Sartore et al. ............... 710/8 |
| 6,073,193 | A | * | 6/2000 | Yap ............................. 710/100 |
| 6,249,825 | B1 |   | 6/2001 | Sartore et al. ............... 710/8 |
| 6,600,739 | B1 | * | 7/2003 | Evans et al. ................ 370/362 |
| 6,625,761 | B1 | * | 9/2003 | Sartore et al. ............... 714/43 |
| 6,647,452 | B1 | * | 11/2003 | Sonoda ....................... 710/305 |

* cited by examiner

Primary Examiner—Jeffrey Gaffin
Assistant Examiner—Tammara Peyton
(74) Attorney, Agent, or Firm—Wagner, Murabito & Hao LLP

(57) ABSTRACT

A dynamically and independently reconfigurable multi-mode device, and a method thereof. The device can include a controller for selecting a mode of operation. The device is configured according to the mode of operation. The configuration information corresponding to the mode of operation resides on the device such that the configuring is accomplished independent of a host device. The device also can include interface circuitry for simulating disconnection of the device from, and reconnection of the device to, the host device. The selected mode of operation is implemented between the simulated disconnection and reconnection.

20 Claims, 5 Drawing Sheets

SYSTEM FOR RECONFIGURING A PERIPHERAL DEVICE USING CONFIGURATION RESIDING ON THE PERIPHERAL DEVICE BY ELECTRONICALLY SIMULATING A PHYSICAL DISCONNECTION AND RECONNECTION TO A HOST DEVICE

FIELD OF THE INVENTION

Embodiments of the present invention relate to configurable multi-mode peripheral devices. More specifically, embodiments of the present invention relate to peripheral devices that can be dynamically configured and reconfigured independently of a host device.

BACKGROUND ART

A peripheral device may be coupled to a host device using a variety of different cables, connectors and buses. One mechanism for coupling devices that is growing in favor and use is a Universal Serial Bus (USB). A USB provides a standardized and high bandwidth connection between a peripheral device and a host device. A USB typically supports operation in different modes. For example, the peripheral device and the host device may communicate at different rates depending on a selected mode of operation. The standard modes of operation include a low-speed mode, a full-speed mode, and a high-speed mode.

However, changing the operating mode of a conventional USB device (that is, a USB-compatible peripheral device) can be problematic. In one conventional approach, operation at low speed and at full speed is supported. However, the USB device is hard-wired into one mode or the other. To change modes, USB configuration resistors and phase-locked loop (PLL) settings need to be changed. Changing the PLL settings requires powering off the peripheral device, changing a jumper, and then restarting the device.

In another conventional approach, a peripheral device and USB are initialized according to configuration information downloaded from a host device. To change operating mode, new configuration information is downloaded from the host device. The peripheral device is disconnected from the host device, reconfigured according to the new configuration information, and reconnected to the host device. While this latter approach provides some advantages over the first approach, in some circumstances the change in mode may be problematic because intervention by the host device is needed. The dependency of the peripheral device on the host device can limit the flexibility of the peripheral device.

Another conventional approach allows the peripheral device and the host device to in essence agree on a mode of operation, with the peripheral device then implementing a configuration accordingly. For example, the peripheral device may initially attempt to establish a high-speed connection with the host device. If such a connection is not available from the host device, the peripheral device falls back to a full-speed mode. However, this approach is problematic because subsequent attempts to reconfigure the peripheral device for a different mode of operation are encumbered by the problems described above.

Therefore, what is needed is a peripheral device that can be configured and reconfigured without encountering the aforementioned problems. What is also needed is a device that can satisfy this need for USB. The present invention provides a novel solution to these needs.

SUMMARY OF THE INVENTION

Embodiments of the present invention pertain to a device that can be configured and reconfigured for different operating modes independent of a host device.

In one embodiment, the device includes a controller for selecting a mode of operation. The device is configured according to the mode of operation. The configuration information corresponding to the mode of operation resides on the device such that the configuring is accomplished independent of a host device. In this embodiment, the device also includes interface circuitry for simulating disconnection of the device from, and reconnection of the device to, the host device. The selected mode of operation is implemented between the simulated disconnection and reconnection.

In one embodiment, the interface circuitry is couplable to a Universal Serial Bus (USB) that couples the device to the host device. The USB remains coupled to the device and the host device while the disconnection and reconnection are simulated. In this embodiment, a first data line and a second data line are coupled to the interface circuitry. A supply voltage is selectively coupled to one of the data lines according to which mode of operation is selected. By monitoring the data lines the host device can determine the mode of operation of the peripheral device.

In another embodiment, the selected mode of operation characterizes a rate at which data are communicated with the host device via the interface circuitry. In one such embodiment, the device also includes a data processor. The data processor processes data according to the rate at which data are communicated with the host device.

In yet another embodiment, the device includes a clock generator that operates at a speed corresponding to the selected mode of operation.

These and other objects and advantages of the various embodiments of the present invention will become recognized by those of ordinary skill in the art after having read the following detailed description of the embodiments that are illustrated in the various drawing figures.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION OF THE INVENTION

Figure 1:
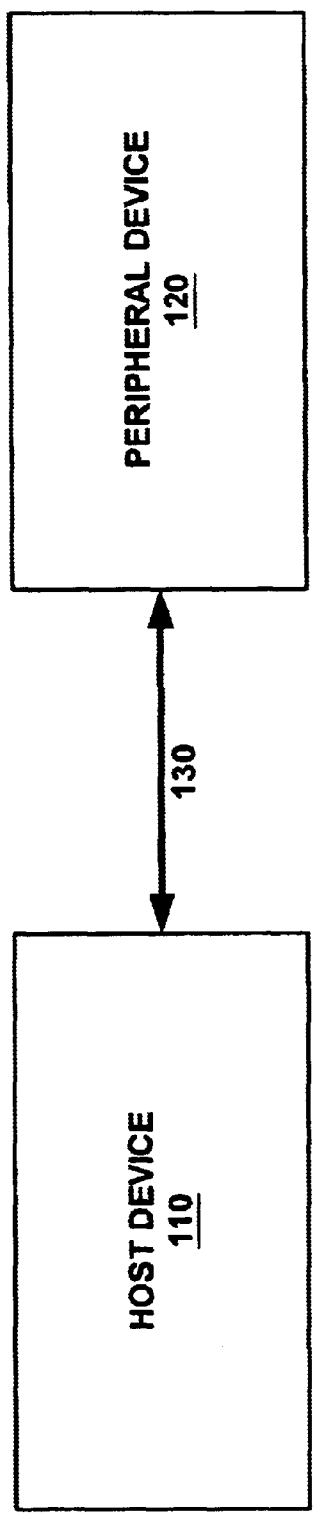
FIG. 1 is a block diagram showing a host device and a peripheral device in communication according to one embodiment of the present invention.

Reference will now be made in detail to the various embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be understood that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining," "simulating," "implementing," "interfacing," "switching," "coupling," "decoupling," "selecting," "processing" or "operating" or "receiving" or "communicating" or the like, refer to actions and processes (e.g., flowchart 400 of FIG. 4) of a computer system or similar electronic computing device. The computer system or similar electronic computing device manipulates and transforms data represented as physical (electronic) quantities within the computer system memories, registers or other such information storage, transmission or display devices. The present invention is well suited to use with other computer systems.

FIG. 1 is a block diagram showing a host device 110 and a peripheral device 120 in communication according to one embodiment of the present invention. In this embodiment, host device 110 and peripheral device 120 are coupled using a serial bus 130. In one embodiment, serial bus 130 is a Universal Serial Bus (USB).

In a USB type of embodiment, peripheral device 120 has the capability to communicate content (e.g., data and other types of information) to host device 110 using different modes of operation. The modes of operation determine some key aspect of device performance. For example, a USB mode may determine the minimum power a device will utilize to stay active, the amount of data bandwidth available, the signaling radio frequency (RF) emissions that are characteristic of the device, and/or the device's degree of immunity to a noisy environment. In a USB embodiment, there are three different modes of operation characterized by the speed at which data and other such information are communicated: low speed, full speed, and high speed. Generally speaking, features of the present invention can be utilized with any two or more devices communicating via a bus, such as a USB, in which different modes of operation may be utilized.

Typically, peripheral device 120 is initialized at startup (for example, when powered on) in one of the modes of operation (that is, a default mode). Alternatively, a default mode of operation may be implemented when peripheral device 120 is first connected to bus 130 (e.g., a USB). In any case, the peripheral device 120 is initially configured to operate in one of the modes.

Significantly, in accordance with the present embodiment, configuration information corresponding to each of the possible modes of operation for peripheral device 120 is resident on the peripheral device. As such, should peripheral device 120 start up in a default mode or in a mode other than the default mode, it can do so independently of host device 110.

Moreover, should peripheral device 120 elect to change modes at any time after initialization, it can do so independently of host device 110. That is, according to the various embodiments of the present invention, peripheral device 120 is provided with the capability to dynamically and independently change its mode of operation and its configuration. Furthermore, peripheral device 120 can continually change back and forth between the various modes of operation, as desired. Moreover, as will be seen, peripheral device 120 can change between modes of operation without having to be physically disconnected from and reconnected to host device 110; refer to FIGS. 3A and 3B, below.

For example, peripheral device 120 may operate in a low power (low speed) mode for a period of time to conserve power. However, when a large amount of data needs to be communicated (to host device 110, for instance), peripheral device 120 may switch to a higher speed mode (e.g., to full speed). Then, when the data transfer is completed, peripheral device 120 can switch back to the low speed (low power) mode.

Similarly, peripheral device 120 may determine that the data transfer error rate is high, as exhibited by the need for frequent retries. In response, peripheral device 120 can change to a different mode of operation (perhaps a lower speed mode) to improve the reliability of data transfer.

Peripheral device 120 may also elect to change modes of operation depending on whether the device is presently powered by a battery or by an external power source. For example, while running off of an adapter plugged into a wall socket, peripheral device may operate at a higher speed mode. When switched to battery power, peripheral device 120 can switch to a low speed (low power) mode to conserve power.

Another reason that peripheral device 120 may elect to change modes is that it could exhibit itself as two (or more) different types of devices that alternate periods of time on the bus 130. For instance, peripheral device 120 may alternately be represented as a low-speed device (e.g., a keyboard) and as a high-speed device (e.g., a card reader), depending on the function or application for which the device is being used. As another example, peripheral device 120 may be part of a data acquisition system of some type. While acquiring data, during which there may be little data transfer to the host device 110, peripheral device 120 may elect to operate in a low speed mode; however, to transfer acquired data to host device 110, the peripheral device 120 may then elect to operate in a higher speed mode.

Generally speaking, portable and embedded applications, in which power may be a premium and in which data transfer to a host device may occur in bursts as opposed to continuously, would benefit from a peripheral device that can dynamically and independently change its mode of operation and hence its configuration. It is contemplated that a dynamically and independently reconfigurable multi-mode device can provide considerable flexibility to designers, who can use such a device in new applications not previously considered owing to the limitations of conventional devices. The range of applications is also increased because of the device's applicability to both single mode and multi-mode applications.

Figure 2:
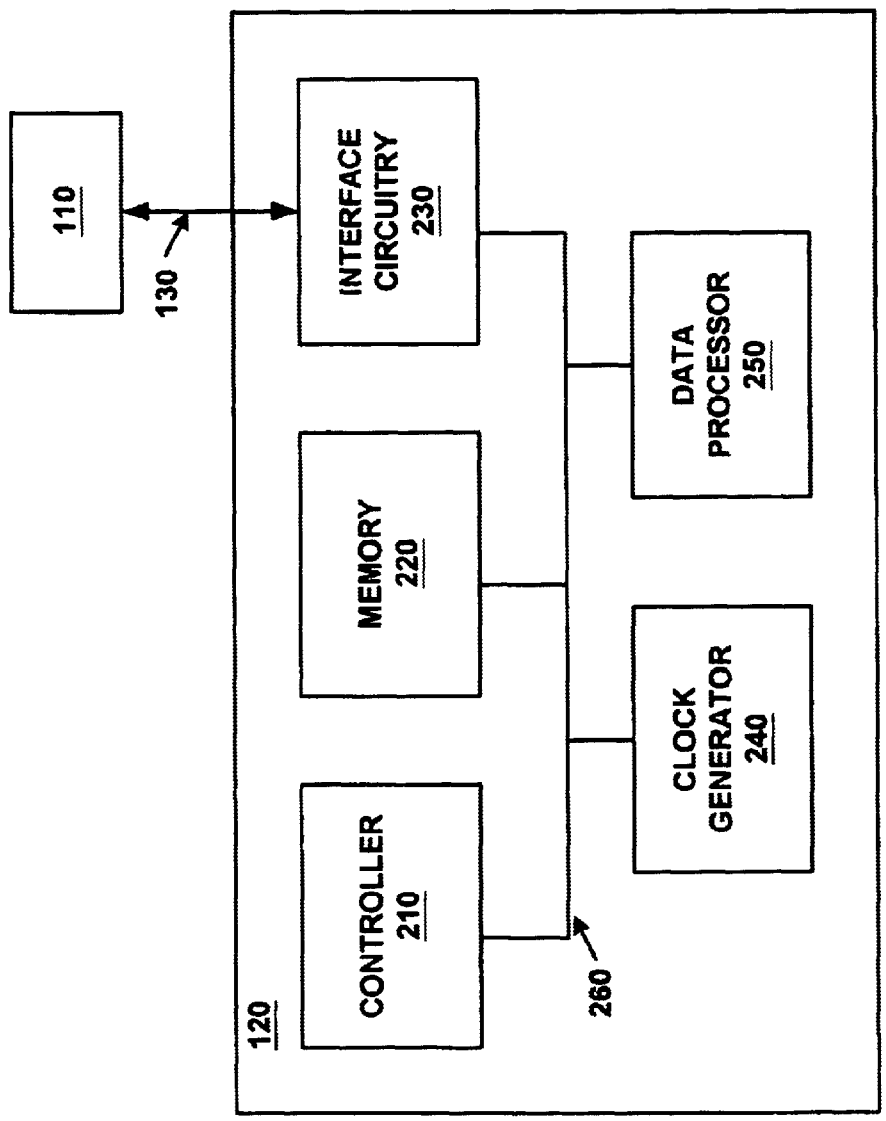
FIG. 2 is a block diagram of one embodiment of a peripheral device upon which embodiments of the present invention may be implemented.

FIG. 2 is a block diagram of one embodiment of a peripheral device 120 upon which embodiments of the present invention may be implemented. In this embodiment, peripheral device 120 includes a controller 210, a memory 220, interface circuitry 230, a clock generator 240, and a data processor 250, coupled using an internal bus 260. Interface circuitry 230 is also coupled to bus 130, which as mentioned above may be a USB. It is appreciated that peripheral device 120 may include elements other than those illustrated and described. It is also appreciated that the functionality of one or more of the elements of peripheral device 120 may be combined into a single element. In general, peripheral device 120 includes one or more elements that provide the functionality of the elements suggested by FIG. 2.

In the present embodiment, controller 210 essentially functions to control and configure the other elements (blocks) according to the selected mode of operation. Controller 210 can also function to select the mode of operation based on particular aspects of device performance, as explained above. For example, controller 210 can select a mode of operation to optimize power consumption, bandwidth, RF emission characteristics, or immunity to noise, or to strike an appropriate balance between various combinations of these factors. Controller 210 can select the mode of operation either at startup or during subsequent operation.

Controller 210 can base its decisions in hardware, firmware, and/or software. In the present embodiment, controller 210 is in communication with memory 220. Memory 220, in one embodiment, is non-volatile memory that can include information used by controller 210. Specifically, in one embodiment, memory 220 includes configuration information used by controller 210 to configure peripheral device 120 according to the selected mode of operation. Because the configuration information resides on peripheral device 120, the device can dynamically change configuration without a download from host device 110.

In the present embodiment, peripheral device 120 also includes interface circuitry 230. In one embodiment, interface circuitry 230 is compliant with USB standards and protocols, including USB 1.1 and 2.0. Embodiments of interface circuitry 230 are described in conjunction with FIGS. 3A and 3B, below.

In one embodiment, peripheral device 120 of FIG. 2 includes a data processor 250 coupled to controller 210. In this embodiment, data processor 250 is a data processing engine that can process bus data according to the selected mode of operation. For example, the speed at which data processor 250 processes bus data corresponds to the speed of data transfer associated with the selected mode of operation. Data processor 250 may be known as a Serial Interface Engine (SIE) or USB SIE. In one embodiment, peripheral device 120 also includes clock generator 240, which operates at a speed corresponding to the selected mode of operation and drives data processor 250 accordingly.

Figure 3A:
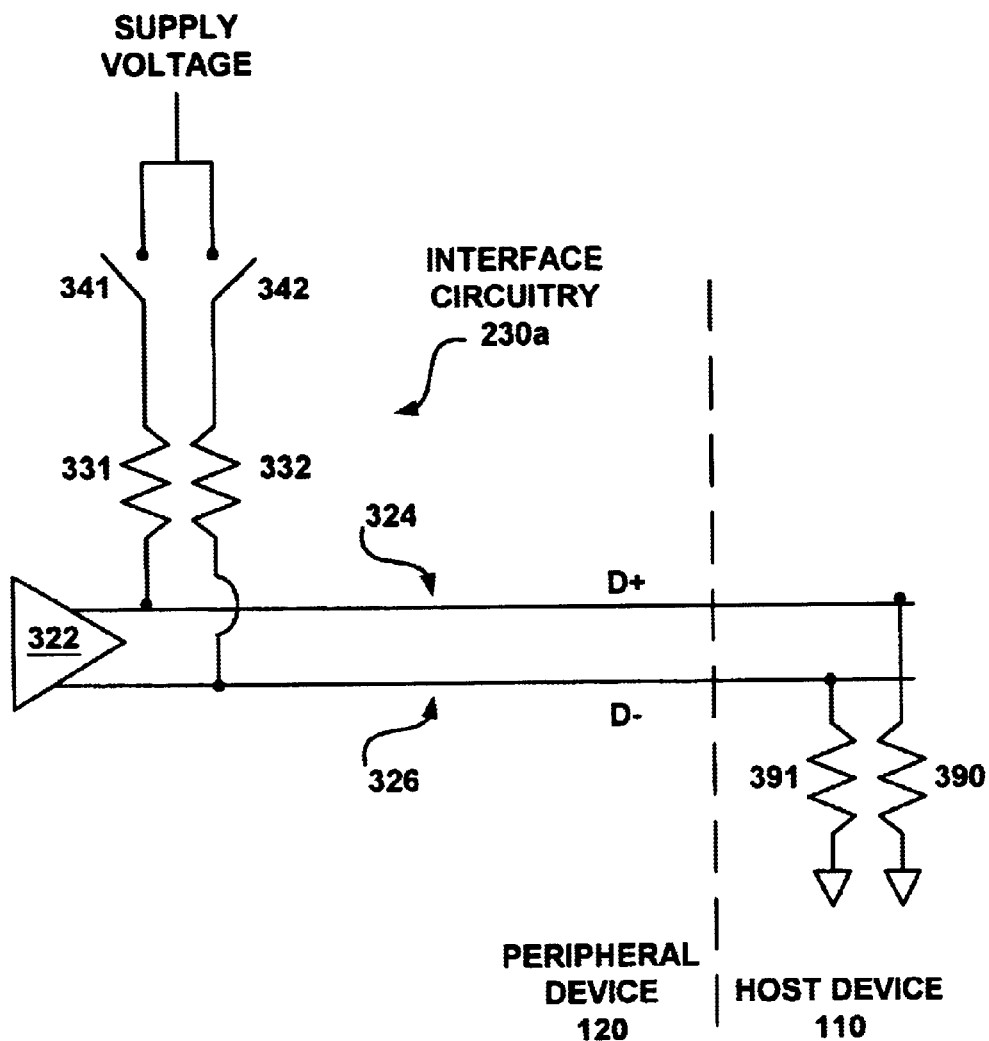
FIG. 3A illustrates an interface circuit according to one embodiment of the present invention.

FIG. 3A illustrates interface circuitry 230a according to one embodiment of the present invention. In one embodiment, interface circuitry 230a is USB-compliant and, as such, is couplable to a USB. In this embodiment, interface circuitry 230a includes a buffer amplifier 322 coupled to a first buffer output (data line) 324 labeled D+ and a second buffer output (data line) 326 labeled D–.

According to the present embodiment, on peripheral device 120, data line 324 is coupled to a pull-up resistor 331 and a switch 341, and data line 326 is coupled to a pull-up resistor 332 and a switch 342. The switches 341 and 342 in turn are used to selectively couple either data line 324 or data line 326, respectively, to a supply voltage (e.g., power provided from peripheral device 120). A typical value for the supply voltage is 3.3 volts, and resistors 331 and 332 typically each provide a resistance of 1.5 k$\Omega$ (1500 ohms).

In one embodiment, the positions of switches 341 and 342 are under control of the controller 210 (FIG. 2) using control leads (not shown) coupled to the switches. It is appreciated that the switches 341 and 342 may also function under control of host device 110, either directly or indirectly. In the latter (indirect) case, host device 110 may issue a command to controller 210 including instructions for the positions of the switches 341 and 342. In general, the switches 341 and 342 are controllable by peripheral device 120 and/or host device 110.

Continuing with reference to FIG. 3A, in host device 110 the data lines 324 and 326 are respectively coupled to pull-down resistors 390 and 391. A typical value for each of the resistors 390 and 391 is 15 k$\Omega$ (15,000 ohms). In general, the pull-down resistors 390 and 391 on host device 110 are larger than the pull-up resistors 331 and 332 of peripheral device 120.

Interface circuitry 230a functions to electronically disconnect peripheral device 120 from and reconnect peripheral device to host device 110. Specifically, interface circuitry 230a functions to electronically disconnect peripheral device 120 from and reconnect peripheral device 120 to bus 130 (e.g., a USB). The disconnection and reconnection of peripheral device 120 from host device 110 are thereby accomplished without physically disconnecting and reconnecting the host and peripheral devices; that is, the disconnection and reconnection are simulated. While the disconnection (and reconnection) are simulated, the bus 130 remains coupled between host device 110 and peripheral device 120.

The operation of interface circuitry 230a will be described below. From that discussion, it will be understood that interface circuitry 230a may include elements other than those suggested by FIG. 3A, or may be configured differently from that illustrated in FIG. 3A.

With switch 341 closed, the supply voltage is coupled to data line 324. With switch 342 closed, the supply voltage is coupled to data line 326. In general, the states of the data lines 324 and 326 indicate the mode of operation of peripheral device 120. In the present embodiment, a pulled-up voltage on data line 324 (D+) indicates peripheral device 120 has selected a higher speed mode, while a pulled-up voltage on data line 326 (D–) indicates peripheral device 120 has selected a lower speed mode. Host device 110 monitors the data lines 324 and 326 for the pulled-up voltages, and thus can determine which mode of operation has been selected by peripheral device 120. That is, in the present embodiment, a pulled-up voltage on data line 324 indicates to host device 110 that the higher speed mode of operation has been selected, and similarly a pulled-up voltage on data line 326 indicates that the lower speed mode of operation has been selected. Note that data may be transmitted over both data lines 326 and 324 although a pulled-up voltage may be present on only one of the data lines.

Suppose peripheral device 120 is operating in a lower speed mode of operation, and a change in mode of operation to a higher speed mode is to be performed. While in the lower speed mode of operation, switch 342 is closed and switch 341 is open. To change to a higher speed mode of operation, switch 342 is also opened. With both switches 341 and 342 open, there is no pulled-up voltage on either of the data lines 324 and 326, simulating disconnection of peripheral device 120 from host device 110. During this period, in which peripheral device 120 appears to be disconnected from host device 110, peripheral device 120 is reconfigured for the higher speed mode of operation. As mentioned above, the configuration information corresponding to the new (different) mode of operation is resident on peripheral device 120, and so peripheral device 120 can be reconfigured independently of host device 110. Once the reconfiguration for the new mode of operation is completed, switch 341 is closed while switch 342 remains open. Accordingly, a pulled-up voltage will be present on data line 324 (D+), and host device 110 can thereby determine that peripheral device 120 will now be operating in the higher speed mode. Data can then be transmitted between peripheral device 120 and host device 110 using both data lines 324 and 326 according to the higher speed mode of operation. In a manner similar to that just described, a switch from a higher speed mode of operation to a lower speed mode of operation can be accomplished.

In summary, disconnection of peripheral device 120 from, and reconnection of peripheral device 120 to, host device 110 is effected without actually (e.g., physically) disconnecting the two devices. During the period in which peripheral device 120 appears to be disconnected from host device 110, peripheral device 120 can be reconfigured in a new (different) mode of operation using configuration information resident on peripheral device 120.

Figure 3B:
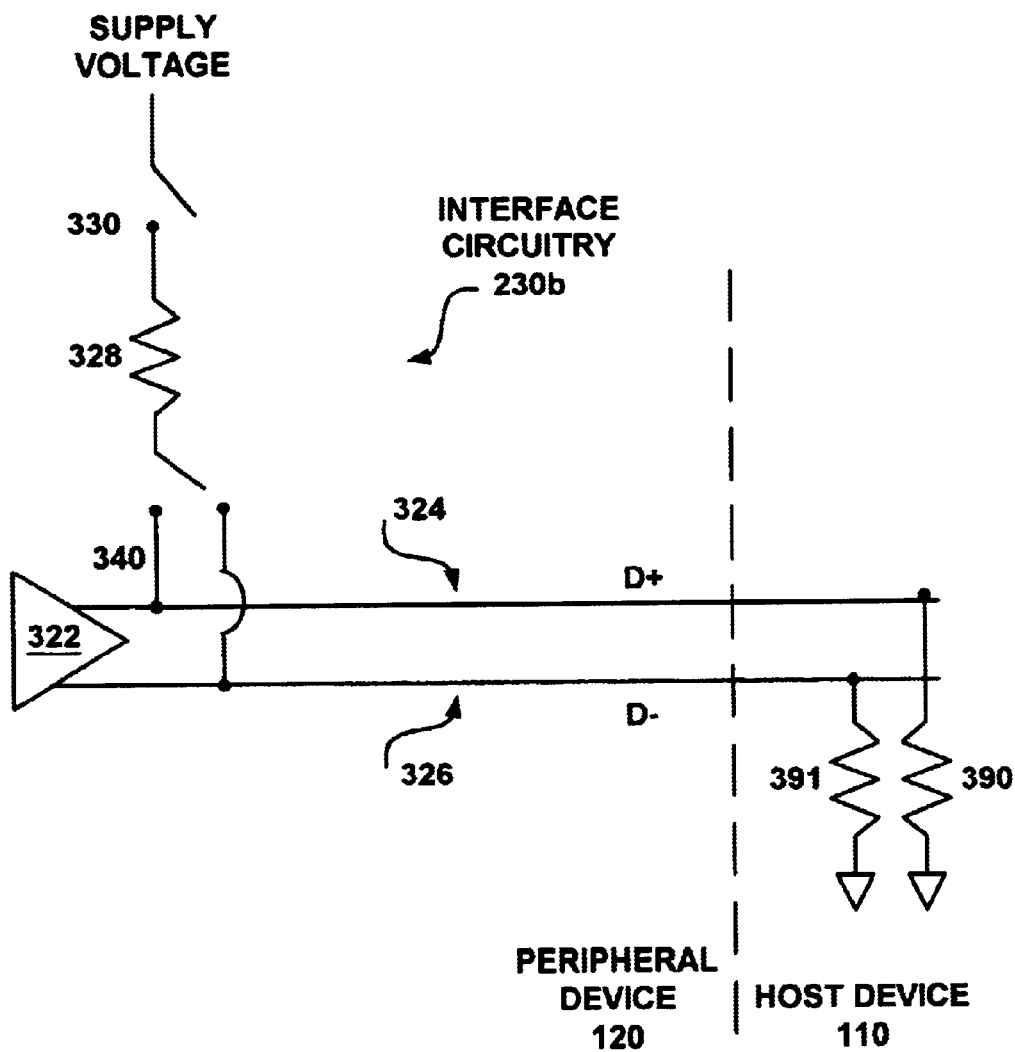
FIG. 3B illustrates an interface circuit according to another embodiment of the present invention.

FIG. 3B illustrates interface circuitry 230b according to another embodiment of the present invention. In one embodiment, interface circuitry 230b is USB-compliant and, as such, is couplable to a USB. In this embodiment, data lines 324 and 326 are coupled to a pull-up resistor 328 via switch 340. Switch 340 is used to selectively couple either data line 324 or data line 326 to a supply voltage via another switch 330. In the present embodiment, a typical value for the supply voltage is 3.3 volts, and resistor 328 typically is 1.5 kΩ. As in the embodiment of FIG. 3A, the pull-down resistors 390 and 391 are generally larger than the pull-up resistor 328.

In one embodiment, switches 330 and 340 are under control of the controller 210 (FIG. 2) via a control lead (not shown). It is appreciated that the switches 330 and 340 may also function under control of host device 110, either directly or indirectly. In the latter (indirect) case, host device 110 may issue a command to controller 210 including instructions for the positions of the switches 330 and 340. In general, the switches 330 and 340 are controllable by peripheral device 120 and/or host device 110.

Interface circuitry 230b functions to electronically disconnect peripheral device 120 from and reconnect peripheral device 120 to host device 110. Specifically, interface circuitry 230b functions to electronically disconnect peripheral device 120 from and reconnect peripheral device 120 to bus 130 (e.g., a USB). The disconnection and reconnection are accomplished without physically disconnecting and reconnecting the host and peripheral devices; that is, the disconnection and reconnection are simulated. While the disconnection (and reconnection) are simulated, the bus 130 remains coupled between host device 110 and peripheral device 120.

The operation of interface circuitry 230b will be described below. From that discussion, it will be understood that interface circuitry 230b may include elements other than those suggested by FIG. 3B, or may be configured differently from that illustrated in FIG. 3B.

With switch 330 closed, and depending on the position of switch 340, either data line 324 or data line 326 is coupled to the supply voltage. With switch 330 open, neither data line 324 nor data line 326 is coupled to the supply voltage. Therefore, the position of switch 330 can be used to connect/disconnect the supply voltage to/from switch 340 (and hence to/from data lines 324 and 326). By opening or closing switch 330, interface circuitry 230b can simulate disconnection of peripheral device 120 from host device 110 and reconnection of peripheral device 120 to host device 110. While peripheral device 120 appears to be disconnected from host device 110, a new (different) mode of operation can be implemented using configuration information resident on peripheral device 120. The position of switch 340 can be used to provide a pulled-up voltage on either of the data lines 324 or 326, depending on the selected mode of operation. Host device 110 monitors for a pulled-up voltage on either data line 324 or 326 to determine the mode of operation of peripheral device 120.

Figure 4:
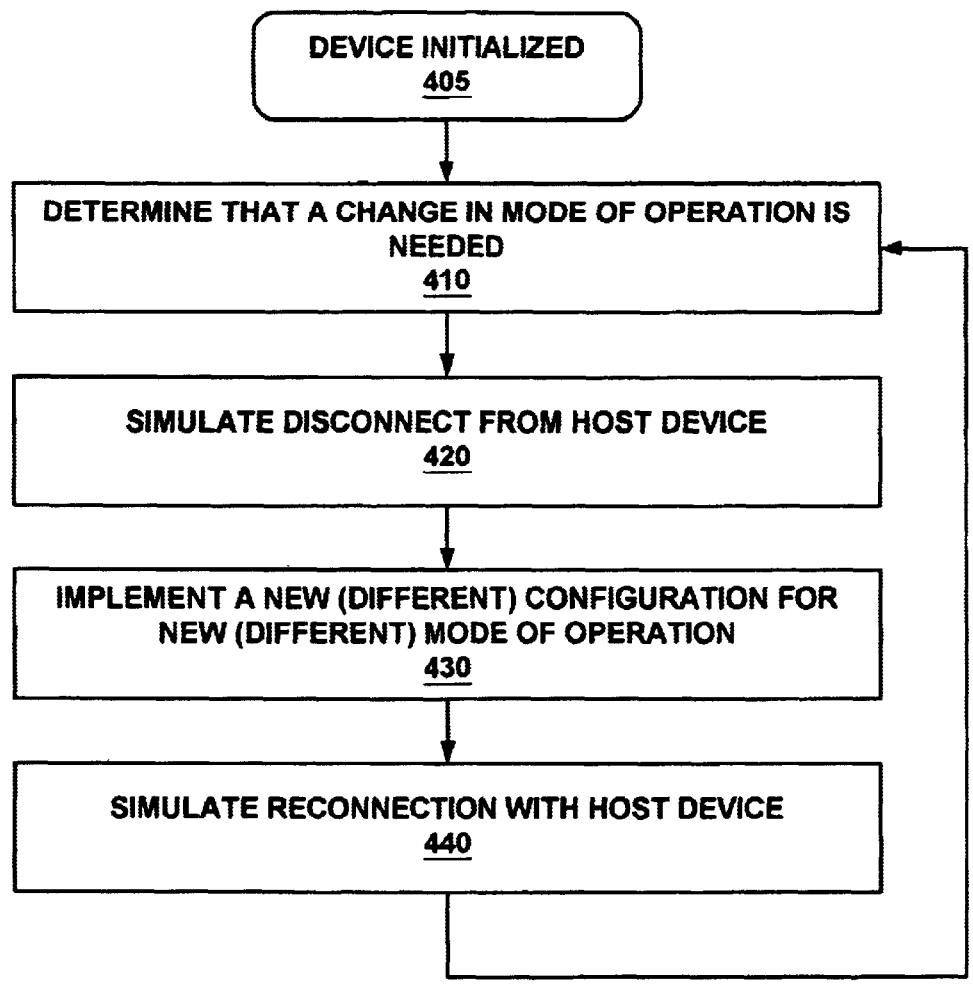
FIG. 4 is a flowchart illustrating a method for dynamically reconfiguring a peripheral device according to one embodiment of the present invention.

FIG. 4 is a flowchart illustrating a method for dynamically and independently configuring and reconfiguring a peripheral device (e.g., peripheral device 120 of FIG. 1) according to one embodiment of the present invention. Flowchart 400 includes processes of the present invention that, in one embodiment, are carried out by a controller (processor) under the control of computer-readable and computer-executable instructions. Although specific steps are disclosed in flowchart 400, such steps are exemplary. That is, the present invention is well suited to performing various other steps or variations of the steps recited in flowchart 400. It is appreciated that the steps in flowchart 400 may be performed in an order different than presented, and that not all of the steps in flowchart 400 may be performed.

In step 405 of FIG. 4, in the present embodiment, the peripheral device is initialized according to an initial mode of operation. The initial mode of operation may be a predetermined default mode. Alternatively, the initial mode may be selected by the peripheral device, either by the peripheral device itself or under command of the host device, based on perhaps the operation or application to be executed following initialization. For example, the peripheral device may select a higher speed mode of operation if data transfer is to occur. According to the various embodiments of the present invention, the configuration information utilized to configure the peripheral device is resident (e.g., in memory) on the peripheral device.

In one embodiment, to initialize the peripheral device according to a particular mode of operation, and with reference to FIG. 2, controller 210 obtains the appropriate configuration information from memory 220. Data processor 250 is commanded by controller 210 to process bus data at a rate corresponding to the selected mode, and clock generator 240 is commanded to operate at a clock speed that will drive data processor 250 accordingly. In the embodiment of FIG. 3A, after the initial configuration is accomplished, either switch 341 or 342 is closed, depending on the selected (initial) mode of operation. In the embodiment of FIG. 3B, switch 330 is closed and switch 340 is set to the appropriate position according to the selected (initial) mode of operation.

In step 410 of FIG. 4, in the present embodiment, a determination is made that a change in the mode of operation is needed. This determination may be made by a host device (e.g., host device 110) coupled to the peripheral device, or it may be made by the peripheral device itself. The determination may also be made by a hardware element other than host device 110 and peripheral device 120, typically coupled to the peripheral device via some means other than bus 130 (FIG. 1). The determination may be based on particular aspects of device performance. For example, it may be necessary or desirable to optimize power consumption, bandwidth, RF emission characteristics, or immunity to noise, or to strike an appropriate balance between various combinations of these factors. By changing the mode of operation—for instance, from a higher speed mode of operation to a lower speed mode of operation, or vice versa—it may be possible to improve some aspect of the performance of the peripheral device.

In step 420, in the present embodiment, a disconnect of the peripheral device from the host device is simulated. That is, the peripheral device actually remains physically connected to the host device, via a bus such as a USB bus; however, from the perspective of the host device, the peripheral device is apparently disconnected.

In one embodiment, the disconnect is simulated as described with reference to FIG. 3A. That is, the switches 341 and 342 are both opened. In another embodiment, the disconnect is simulated as described with reference to FIG. 3B. That is, the switch 330 is opened.

In step 430 of FIG. 4, in the present embodiment, a new (different) mode of operation is implemented while the peripheral device and the host device are (apparently) disconnected. That is, the peripheral device is configured for the different mode of operation using the configuration information resident on the peripheral device. To configure the peripheral device for the different mode of operation, with reference to FIG. 2, controller 210 obtains the appropriate configuration information from memory 220. Data processor 250 is commanded by controller 210 to switch to the new mode of operation and clock generator 240 is commanded also to change speeds and to drive data processor 250 accordingly. As described above, the new configuration can be implemented by the peripheral device independent of the host device.

In step 440 of FIG. 4, in the present embodiment, the peripheral device is electrically reconnected to the host device. In the embodiment of FIG. 3A, one of the switches 341 or 342 is closed according to the selected (new) mode of operation. In the embodiment of FIG. 3B, switch 330 is closed and switch 340 is placed in the appropriate position according to the selected (new) mode of operation. Typically, the simulated disconnect between the peripheral and host devices is relatively short in time, perhaps on the order of milliseconds.

Operation in the selected mode can continue until another determination is made that a change in operating mode is desired or needed (step 410). According to the various embodiments of the present invention, a peripheral device can switch back and forth between operating modes as often and as many times as necessary.

In summary, embodiments of the present invention provide a device and method thereof that support multi-modes (e.g., USB modes) internally, and that allow changes in operating modes to be implemented independent of another (e.g., host) device (that is, without a download from another device). Thus, the device can be optimized to meet changing conditions.

Embodiments of the present invention, a dynamically and independently reconfigurable multi-mode device, are thus described. While the present invention has been described in particular embodiments, it should be appreciated that the present invention should not be construed as limited by such embodiments, but rather construed according to the below claims.

What is claimed is:

1. A device comprising:
   a controller operable to select a mode of operation, said device configurable according to said mode of operation using configuration information residing on said device such that configuration of said device is accomplished independent of a host device; and
   interface circuitry coupled to said controller and operable to simulate disconnection of said device from and reconnection of said device to said host device, wherein said mode of operation is implemented between said disconnection and said reconnection.

2. The device of claim 1 wherein said interface circuitry is couplable to a Universal Serial Bus (USB) that couples said device to said host device, wherein said USB remains coupled to said device and to said host device while said disconnection and reconnection are simulated.

3. The device of claim 1 wherein said interface circuitry is coupled to a first data line and a second data line, wherein said interface circuitry is operable to couple a supply voltage to one of said first and second data lines according to said mode of operation.

4. The device of claim 1 wherein said mode of operation characterizes a rate at which data are communicated with said host device via said interface circuitry.

5. The device of claim 1 comprising a data processor coupled to said controller, said data processor operable to process said data according to a rate corresponding to said mode of operation.

6. The device of claim 1 comprising a clock generator coupled to said controller, said clock generator operating at a speed corresponding to said mode of operation.

7. A Universal Serial Bus (USB) device comprising:
   a controller operable to select between a first mode of operation and a second mode of operation, said USB device configurable according to which of said first and second modes of operation is selected using configuration information residing on said USB device such that configuration of said USB device is accomplished independent of a host device;
   a first data line and a second data line coupled to said controller, said first and second data lines operable to communicate data to said host device; and
   circuitry coupled to said first and second data lines, said circuitry operable to selectively couple a supply voltage to one of said first and second data lines according to which of said first and second modes of operation is selected.

8. The USB device of claim 7 wherein a selected mode of operation is implemented by simulating disconnection of said USB device from and reconnection of said USB device to said host device, wherein a USB coupling said USB device and said host device remains coupled during said simulating.

9. The USB device of claim 7 wherein said first mode of operation characterizes a first rate and said second mode of operation a second rate at which data are communicated with said host device.

10. The USB device of claim 7 comprising a data processor coupled to said controller, said data processor operable to process said data according to a rate corresponding to which of said first and second modes of operation is selected.

11. The USB device of claim 7 comprising a clock generator coupled to said controller, said clock generator operating at a speed corresponding to which of said first and second modes of operation is selected.

12. The USB device of claim 7 wherein said circuitry comprises:
   a first switch for coupling said circuitry and said supply voltage; and
   a second switch for coupling said circuitry to one of said first and second data lines.

13. The USB device of claim 7 wherein said circuitry comprises:
   a first switch for coupling said supply voltage to said first data line; and
   a second switch for coupling said supply voltage to said second data line.

14. A method for dynamically reconfiguring a device according to a different mode of operation, said method comprising:
   determining that a change in mode of operation is needed;
   simulating disconnection of said device from a host device;
   implementing a configuration according to said different mode of operation using configuration information residing on said device, wherein said implementing is performed independent of said host device; and
   simulating reconnection of said device to said host device, wherein said device interfaces with said host device according to said different mode of operation.

15. The method of claim 14 wherein said device comprises interface circuitry couplable to a bus comprising a first data line and a second data line.

16. The method of claim 15 comprising:
   decoupling a supply voltage from one of said first and second data lines to simulate said disconnection; and
   coupling said supply voltage to one of said first and second data lines to simulate said reconnection.

17. The method of claim 14 wherein said determining comprises:
   selecting a rate at which data are to be communicated to said host device.

18. The method of claim 17 further comprising:
   processing data at a rate corresponding to said rate at which data are to be communicated to said host device.

19. The method of claim 17 further comprising:
   operating a clock generator at a speed corresponding to said rate at which data are to be communicated to said host device.

20. The method of claim 14 wherein said determining comprises:
   receiving a command from said host device to implement said change in mode of operation.

* * * * *